Jan. 13, 1970     K. J. WIKLUND     3,488,856
GAUGE FOR MEASURING THE INNER DIAMETERS OF TUBES
Filed Dec. 15, 1967
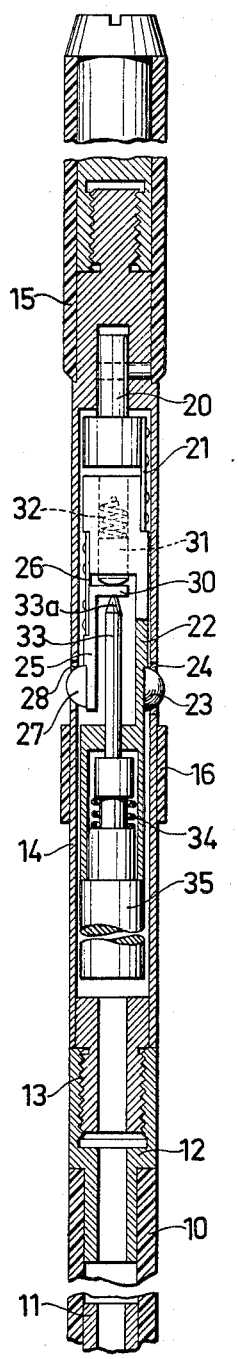

United States Patent Office 3,488,856
Patented Jan. 13, 1970

3,488,856
GAUGE FOR MEASURING THE INNER DIAMETERS OF TUBES
Karl Jorgen Wiklund, Sandviken, Sweden, assignor to Sandvikens Jernverks AB, Sandviken, Sweden, a corporation of Sweden
Filed Dec. 15, 1967, Ser. No. 690,965
Claims priority, application Sweden, May 9, 1967, 6,438/67
Int. Cl. G01b 7/12
U.S. Cl. 33—178                                1 Claim

ABSTRACT OF THE DISCLOSURE

A gauge for measuring the inner diameters of relatively long tubes having relatively small diameters comprises an elongated capsule from which protrude two diametrically opposed measuring heads which are biased outwardly radially of the capsule, together with (a) mechanism for transforming transverse movement of the measuring heads into axial movement of a feeler device and (b) an electrical measuring device which registers axial disposition of the feeler device in terms corresponding to inner diameter measurements.

---

The present invention relates to a gauge for control of the inner diameters of long and narrow tubes.

Heretofore the inner diameters of tubes were controlled by means of pneumatic gauges. However, these are disadvantageous because their precision decreases with the length of the tube and it has shown to be practically impossible to measure tubes which are longer than 4 meters. Another disadvantage of a pneumatic gauge is that it has a very small range of measurement.

Further, electromechanical gauges have been used in measuring tubes; though they have permitted measurement of considerable lengths of tubes, it has not been possible to make them with small enough diameters.

The development in the field of nuclear energy moves toward faster reactors using smaller diametered fuel elements and of the tubes into which these are inserted. The requirements of the tolerances of tubes for these purposes are very high and the difficulties in controlling tube measurements grow bigger as the diameter becomes smaller.

The invention solves these problems with a gauge with mechanical feeler means the transverse movements of which are transformed to axial movements of suitable actuating means. The movement of the actuating means is sensed by means of an electric actuating device. This admits a compact construction with a small diameter of gauge. At the same time, a vast range of measurement is achieved with high accuracy in measurement within the whole range of measurement. This makes it possible continuously to cover a vast range of measurement with a relatively small number of gauges, whereas heretofore it was necessary to provide a gauge for every new dimension of the tube.

The invention is more precisely illustrated in the following description taken with the appended drawing, in which the single figure shows an embodiment of a gauge according to the invention.

The gauge which is shown in the drawing is adapted at the fore portion of a hose 10 of plastic or similar material, the rear of which is connected by a nipple 11 with means (not shown) for turning around and axial movement of the gauge. At the fore end of the hose there is arranged an extension piece 12 having a threaded connection 13 by which the gauge is connected with the hose.

The gauge is outwardly provided with a tube-shaped capsule 14 which surrounds the measuring elements of the guage. The capsule 14 is enclosed as well at the tip of it as at a portion backward from the tip, in guiding sleeves 15 and 16 respectively of Teflon or similar material. These guiding sleeves must have a diameter which is only slightly smaller than the inner diameter of the tube which is to be measured.

The middle portion C of the capsule 14 forms a cavity in which the measuring equipment is enclosed. This is fastened by means of a pin 20 which is fastened in a bore 20' in an otherwise solid portion at the fore end of the capsule. Pin 20 carries, on a plate spring 21, the measuring mechanism which in its entirety can be swung sidewards in bending the spring 21.

The measuring mechanism consists of a measuring device 22 which is fixed to the spring 21 and which forms the frame of the measuring equipment. On the measuring device 22 there is arranged a first semispherical measuring head 23 which protrudes through an opening 24 in the wall of the capsule. On the opposite part of measuring device 22 there is an arm 25 which is attached by a pivot bearing by another plate spring 2. The arm 25 carries a second semispherical measuring head 27 which protrudes through an opening 28 in the capsule. The measuring heads 23 and 27 are placed diametrically to each other. They are made of any suitable wear-resisting material, sintered carbide having proved to be especially suitable.

The arm 25 is provided with a lug 30, perpendicular to the arm, against which lug a pin 31 acts. Pin 31 is situated in an axial bore 31' in the measuring device and is influenced by a spring 32 which tends to swing the measuring head 27 outwards.

Against lug 30 and on the opposite side of it the fore portion of an axially slidable feeler rod 33 is biased by the spring 34 into contact with the lug. The spring 34 is weaker than the spring 32 so that the measuring head 27 is pressed outward by influence of both springs. The feeler rod is connected at its rear portion to an electrical actuator which registers the movements of the feeler rod. This transmitter is indicated only by its cover member 35 and may be of an arbitrary known type, e.g., an inductive device such as a differential transformer having coils surrounding an axially moveable core coupled to the feeler. The axial displacement of the feeler rod 33 results in a change in the inductance.

As an alternative, there may be used a capacitive register which consists of a capacitor, the plate of which is moved by the feeler rod so that there is a registerable alteration in the capacity. The feeler rod is coupled with lines (not shown) along the hose 10 to the measuring equipment known per se to register the impulses.

Principally, in making a measurement the gauge is inserted in the tube to be measured. The coil spring 32 forces the lug 30 backward so that the arm 25 pivots outward in the hinge which is formed by the plate spring 26. When the measuring head 27 contacts the interior of the wall of the tube to be measured, the action of the spring 32 makes the whole measuring device move pivotally outward around the other plate spring 21 so that the measuring head 23 also contacts the interior of the wall of the tube. The situation of the measuring heads is registered via the feeler.

In measuring tubes with somewhat different diameters the measuring head 27 will pivot unequally far from the capsule. In doing so different portions of the sphere 27 contact the wall of the tube whereby the axial movement of the rod 33 will not be exactly proportional to the transverse movement of the measuring heads. In order to compensate for this error it is suitable to give a spherical shape as well to the head 33a of the rod 33 as to the measuring head 27, in which event the ratio of the radii of the spheres are the same as the ratio of the lengths of the lever arms of the arm 25 and the lug 30 of the arm in relation to the hinge 26.

In the gauge according to the invention transverse movement of the measuring heads is transformed into an axial movement of the feeler mechanism. This fact makes it possible to place the bearing mechanism for the measuring heads and the feeler mechanism alongside, whereby the gauge can have a small transverse dimension.

The gauge may be used in the first place for diameters of 25 mm. and smaller ones. For bigger diameters, other designs are more suitable. It has now proved possible to measure tubes with diameters of 10 mm. and less, e.g., down to 4.5 mm., a range which has been difficult to measure with earlier known gauges, especially when the tubes are long. The gauge described above makes possible measuring arbitrarily long tubes with no decrease in the accuracy.

Further advantages of the present gauge are that it has a wide range of measurement for a certain size of the gauge, namely from ±1 mm. at bigger diameters to ±0.3 mm. at the smallest diameters. Accordingly, only a comparatively small number of gauges are needed to cover all conceivable diameters of the tubes. The accuracy of the gauge is independent of where within the range of measurement the measure is made.

Moreover, the gauge exerts only a slight measuring pressure at the same time as it rapidly follows any alteration of the diameter. This is important in avoiding scratching the tubes which are to be measured.

Further, the gauge is rapidly used, and it is possible to measure at a rate of rotation of 300 turns/min. when the axial feed is 20 mm., which means a measuring speed of 6 m./min. at which a control of the diameter along the whole length of the tube is achieved.

In measuring, the guiding sleeves 15, 16 in the figure of drawing should be as close as possible to the inner diameter of the tube and have an outer diameter which is about 0.1 mm. less in order that the position of the gauge is as central as possible in the tube. For smaller alterations within the measuring range for a certain gauge a mere change of the guiding sleeves is made and this is easily done. Thus, if there is a series of gauges for the different ranges of measurement the appropriate gauge can rapidly be provided with appropriate guiding sleeves of suitable sizes. The gauge makes it possible to measure an arbitrary diameter rapidly within the range which is covered by the series of gauges. This is a considerable advantage compared to earlier known gauges which have so small ranges of measurement that it is not possible to keep a series of gauges to cover a vaster range continuously, and therefore, one has to make a new gauge for every new diameter.

I claim:
1. Gauge for measuring the inner diameter of long and narrow tubes, the gauge comprising:
 a capsule from which two diametrically opposed measuring heads protrude;
 a longitudinally extending measuring body in a cavity in said capsule which measuring body carries one of said measuring heads and is swingably attached to the capsule, so that said one measuring head can move together with the measuring body in the radial direction;
 a longitudinally extending lever arm which carries the other of said measuring heads and is swingably attached to the measuring body, so that said other measuring head can move radially together with said lever arm;
 a transversely directed projection on said lever arm; and
 a feeler device on said measuring body having a longitudinally extending feeler arm in contact with said projection, registering the longitudinal displacements of the projection when the measuring head moves radially together with said lever arm.

References Cited

UNITED STATES PATENTS 2,638,681   5/1953   Kinley et al.
2,642,671   6/1953   Graham et al.
2,799,092   7/1957   Abramson.

FOREIGN PATENTS 859,811   12/1952   Germany.

SAMUEL S. MATTHEWS, Primary Examiner